Figures 1, 3:
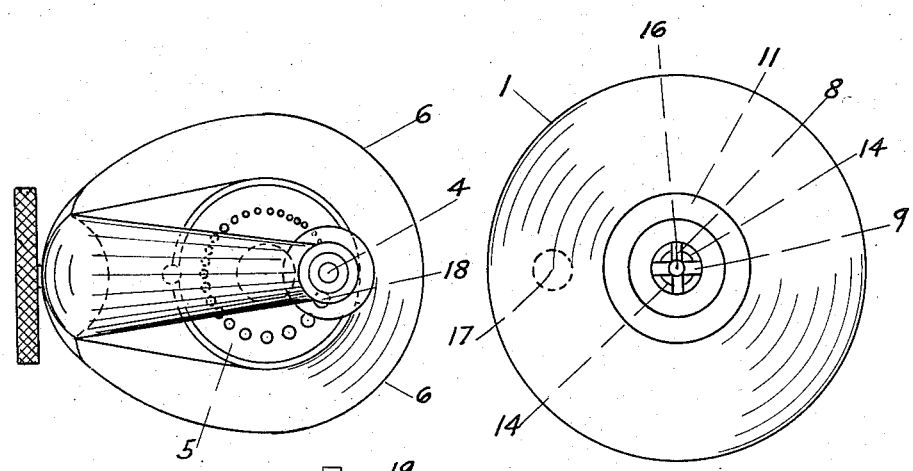

Feb. 24, 1959   O. Z. COLLINS   2,874,455

PALLET ARBOR INSERTING TOOL

Filed March 26, 1956

INVENTOR.
O. Z. (only) Collins
BY Chas. Lenegre
Attorney.

United States Patent Office 2,874,455
Patented Feb. 24, 1959

2,874,455

PALLET ARBOR INSERTING TOOL

O. Z. Collins, Birmingham, Ala.

Application March 26, 1956, Serial No. 573,849

1 Claim. (Cl. 29—231)

This invention relates to a pallet arbor inserting tool for use by watchmakers. It has for its main objects to provide such a tool that will be highly satisfactory for the purpose intended, simple in structure, comparatively cheap to manufacture, easy to use and keep in working condition, and extremely durable. Practically all watches now made are fitted with friction pallet arbors which are in varying diameters. The present arbor inserting tool is made in the form of a chuck so that it is convenient to hold pallet arbors of all diameters used from .30 to approximately .45 mm. This covers all diameters used in wrist watches and most of those used in pocket watches. The tool is designed to be used with a regular staking tool block used by all watchmakers. By setting the present tool on the die of a staking tool it allows a free hand to tighten the arbor in the chuck. Thus, it will eliminate the breakage and loss of pallet arbors.

Other objects and advantages will appear from the drawing and specification.

Figures 2, 4:
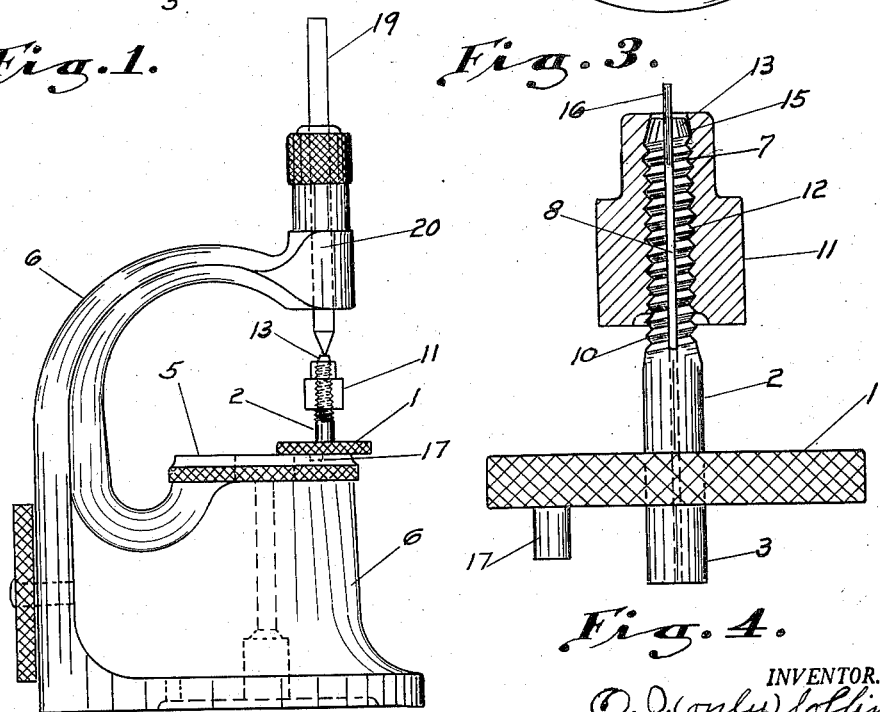

By referring generally to the drawing it will be observed that Fig. 1 is a plan view of a watchmaker's staking tool with a tool made according to the present invention held for use in the staking tool; Fig. 2 is a side elevational view of the two tools shown in Fig. 1; Fig. 3 is a top plan view of Fig. 4; and Fig. 4 is an enlarged view, part full and part in section, of a tool made according to the present invention, with a pallet arbor held partly therein.

Similar reference numerals refer to similar parts throughout the several views.

Referring to the drawing in detail it will be seen that the tool comprises a round base member 1 having a round tube 2 attached in its center with the lower portion 3 being of a size to fit into the largest hole 4 in the adjustable die disk 5 of the staking tool 6 with upper part 7 of the tube having slots 8 and 9 in its upper portion and screw threads 10 in its outer face. A round nut 11 is provided with threads 12 that fit the threads on the tube that is tapered at its top end 13 for its segments 14 to move inward when entering the tapered portion 15 of the nut to thus form a chuck for holding a pallet arbor 16. A stud 17 is attached in the lower face of the base member as a stop for inserting in the second largest hole 18 in the die disk. A punch 19 is used in hole 20 of the staking tool for attaching the arbor to a pallet or fork.

From the foregoing it will appear that in use the tool is first placed on the die disk of the staking tool as plainly shown in Fig. 2. In frictioning a fork to the arbor a hollow-ended flat punch is used. By holding the arbor securely, a fork can be driven on the arbor to any desired depth. The pallet inserting tool does not have to be exactly true as the die disk has a clearance of 1/8" for centering.

The tool may be made of any material suitable for the purpose, but I prefer to use various kinds of metal; also the tool may be made in different sizes and capacities depending on how and where to be used for other purposes than watchmaking and repairs.

While I have shown and described the preferred embodiment of my invention I do not wish to limit same to the exact and precise details of structure, and reserve the right to make all modifications and changes so long as they remain within the scope of the invention and the following claims.

Having described my invention I claim:

A pallet arbor inserting tool of the class described adapted for use in combination with a perforated die disk of a regular watchmaker's staking tool block and comprising a round base member, a tube extending through and beyond the underside of the round member center, one end portion of the tube being slotted to form four segments, the slotted end being tapered, screw threads in the outer face of the slotted portion, the other end of the tube being plain and adapted to fit in the largest hole of said perforated die disk, a stud positioned in the face of the round member outer circumference portion through which the plain portion of the tube extends and adapted to fit in the second largest hole of said perforated die disk; a round nut with threads of a size to fit upon the threads of the tube, said nut being tapered in its end portion that fits upon the tapered portion of the tube, said tapered portion being adapted by manual means to draw the ends of the segments together when the nut is screwed upon the threaded portion.

References Cited in the file of this patent

UNITED STATES PATENTS

| | | |
|---|---|---|
| 852,290 | Neal | Apr. 30, 1907 |
| 892,927 | Bemis | July 7, 1908 |
| 1,236,849 | Lesser | Aug. 14, 1917 |
| 1,655,813 | Helfgott | Jan. 10, 1928 |
| 2,348,727 | Cote | May 16, 1944 |